United States Patent
Oblad et al.

(10) Patent No.: US 8,802,796 B2
(45) Date of Patent: Aug. 12, 2014

(54) AIR AND WATER TOLERANT CATALYST

(75) Inventors: Paul Oblad, North Salt Lake, UT (US);
Matthew S. Winston, Pasadena, CA (US); Jay A. Labinger, Claremont, CA (US); John E. Bercaw, Pasadena, CA (US); Sander Gaemers, East Riding of Yorkshire (GB)

(73) Assignees: California Institute of Technology, Pasadena, CA (US); BP Chemicals Limited (GB)

( * ) Notice: Subject to any disclaimer, the term of this patent is extended or adjusted under 35 U.S.C. 154(b) by 173 days.

(21) Appl. No.: 13/441,545

(22) Filed: Apr. 6, 2012

(65) Prior Publication Data

US 2012/0283398 A1 Nov. 8, 2012

Related U.S. Application Data

(60) Provisional application No. 61/482,087, filed on May 3, 2011.

(51) Int. Cl.
*C08F 4/80* (2006.01)
*C08F 4/70* (2006.01)

(52) U.S. Cl.
USPC ......... 526/117; 526/113; 526/172; 526/169.1

(58) Field of Classification Search
USPC ............... 526/117, 113, 115, 172, 161, 169.1
See application file for complete search history.

(56) References Cited

FOREIGN PATENT DOCUMENTS

JP 11-302236 A * 11/1999 ............. C07C 225/06

OTHER PUBLICATIONS

Sodeoka et al. (JP 11-302236) Nov. 2, 1999; abstract and translation in English.*
Winston et al. Angew. Chem. Int. Ed. 2012, 51, 9822-9824.*
Hagiwara et al. J. Am. Chem. Soc. 1998, 120, 2474-2475.*
Fujii et al. J. Am. Chem. Soc. 1999, 121, 5450-5458.*
Cataldo et al. J. Mol. Catal. A: Chemical 1999, 142, 305-316.*
Cravatto et al. J. Organomet. Chem. 2005, 690, 2017-2016.*
Conley et al. Organometallics 2997, 26, 5447-5453.*
Yoshida et al. Organic Letts. 2008, 10, 5183-5816.*

(Continued)

*Primary Examiner* — Rip A. Lee
(74) *Attorney, Agent, or Firm* — Joseph R. Baker, Jr.; Gavrilovich, Dodd & Lindsey LLP

(57) ABSTRACT

A catalyst and/or precatalyst for olefin oligomerization comprising one or more coordination complexes having one or more central palladium metal atoms. Each palladium atom is bonded to four ligand donor atoms. Two of the donor atoms are group 16 elements and two of the donor atoms are group 15 elements. Also provided are neutral or cationic coordination complex dimers, so that the two palladium atoms are both bonded to one or two donor atoms from group 16, and each palladium atom is bonded to two donor atoms from group 15. In some instances, each of the two group 16 donor atoms are oxygen and each of the four group 15 donor atoms are nitrogen.

19 Claims, 1 Drawing Sheet

(56) References Cited

OTHER PUBLICATIONS

Mallick et al. Transition Met. Chem. 2010, 35, 469-475.*
Oblad, P.F. "Toward the Upgrading of Hydrocarbons: Synthesis, Characterization, and Reactivity of Platinum and Palladium Complexes" Dissertation, California Institute of Technology, 2012 (Defense Aug. 26, 2011).*
Bercaw, John E. et al., "C—H bond activation by [{diimine)Pd—(.mu.—OH)}2]2+ dimers: mechanism-guided catalytic improvement", Angewandte Chemie, International Edition, 47(51), pp. 9941-9943, 2008.
Bork, Ana-Maria, International Search Report and Written Opinion, PCT/US2012/036299, European Patent Office, Aug. 1, 2012.
Meneghetti, S P et al., "Oligomerization of Olefins Catalyzed by New Cationic Palladium(II) Complexes Containing an Unsymmetrical Alpha-Diimine Ligand", Organometallics, ACS, Washington, D.C., vol. 18, Jan. 1, 1999, pp. 2734-2737.
Moon, Kihwan, International Preliminary Report on Patentability and Written Opinion, PCT/US2012/036299, The International Bureau of WIPO, Nov. 5, 2013.
Skupinska, J. "Oligomerization of alpha-olefins to higher oligomers", Chem Rev, 1991, 91(4): 613-648.
Small, B.L. et al., "Iron-Based Catalysts with Exceptionally High Activities and Selectivities for Oligomerization of Ethylene to Linear α-Olefins," J. Am. Chem. Soc., 1998, 120, 7143-7144.
Svejda, S.A., et al., "Ethylene Oligomerization and Propylene Dimerization Using Cationic (α-Diimine)nickel(II) Catalysts", Organometallics, 1999, 18, 65-74.
Williams, Travis J. et al., "C-H Bond activation by air-stable [(Diimine)MII(.mu.2.—OH)]22+ dimers (M=Pd, Pt)", Journal of the American Chemical Society, 130(8), 2418-2419, 2008.
Zhong, H.A. et al., "C-H Bond Activation by Cationic Platinum(II) Complexes: Ligand Electronic and Steric Effects", J. Am. Chem. Soc., 2002, 124, 1378-1399.

* cited by examiner

Reaction 1
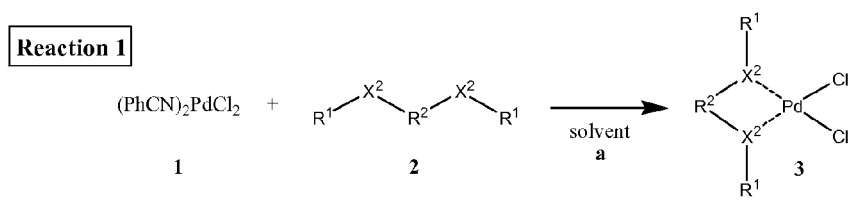
Reaction 2
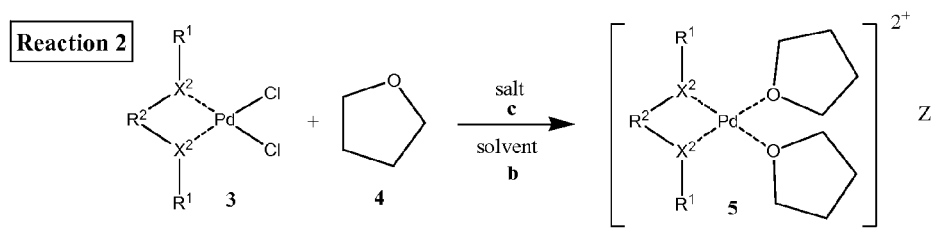
Reaction 3
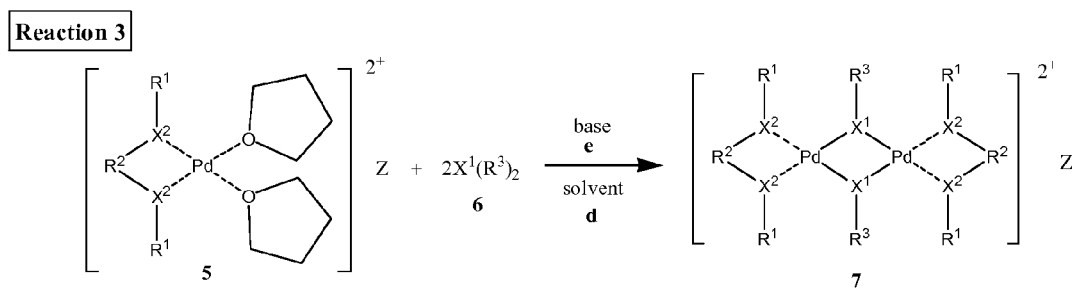

AIR AND WATER TOLERANT CATALYST

CROSS REFERENCE TO RELATED APPLICATIONS

This application claims the benefit of U.S. Provisional Patent Application Ser. No. 61/482,087, filed on May 3, 2011, and incorporated herein in its entirety.

FIELD OF THE INVENTION

The present invention relates to olefin polymerization and/or olefin oligomerization and, more particularly, to catalysis of olefin polymerization and/or olefin oligomerization reactions.

BACKGROUND

Olefin oligomers often serve as important intermediates in the production of lubricants, plasticizers, detergents, surfactants, and fuels. These oligomers are generally synthesized from simple olefinic feedstocks. However, these reactions are often catalyzed using transition metal catalysts that require activating agents such as boranes and methylaluminoxane. These activating agents can decompose upon being exposed to air and/or water. Additionally, many of these activating agents, such as methylaluminoxane, include sensitive metal-carbon bonds that can be broken upon exposure to air and/or water. As a result, these olefin oligomerization processes require rigorously air and moisture-free conditions. Since economic constraints make these conditions inconvenient to achieve on an industrial scale, there is a need for improved olefin oligomerization processes.

SUMMARY

A catalyst and/or precatalyst of the disclosure, which can catalyze olefin oligomerization and/or polymerization, comprising a coordination complex dimer having two central palladium atoms, wherein each of the palladium atoms is bonded to four ligand donor atoms. Two of the donor atoms are each a group 16 element. The palladium atoms are both bonded to a first one of the group 16 elements. The palladium atoms are also both bonded to a second one of the group 16 elements. Four of the donor atoms are each a group 15 element. In some instances, each of the two group 16 elements is oxygen or sulfur and each of the four group 15 elements is nitrogen or phosphorus. In a particular embodiment, each of the two group 16 elements is oxygen and each of the four group 15 elements is nitrogen. In any of the above cases, the four group 15 elements can each be included in a monodentate ligand. Alternately, two of the donor atoms can be included in a bidentate ligand and two of the donor atoms each can be included in a monodentate ligand. Alternately, all four of the donor atoms can be included in two bidentate ligands.

The disclosure provides for a system comprising a mixture having a catalyst disclosed herein dissolved in one or more solvents, wherein the catalysts catalyze the formation of oligomers or polymers from monomers. In a certain embodiment, the mixture may further comprise the monomers.

The disclosure also provides for a method for olefin oligomerization and/or polymerization comprising a reaction mixture comprising a catalyst disclosed herein, monomers, and a solvent system. In a particular embodiment, the mixture comprises a protic solvent in a range of 1-25 vol % or 1-100 vol % of the solution.

Another method of oligomerization and/or polymerization includes dissolving a coordination complex dimer disclosed herein in one or more solvents. The method further includes oligomerizing or polymerizing the monomers such that the oligomerization and/or polymerization of the monomers is catalyzed as a result of the coordination complex dimer dissociating in the one or more solvents. In a particular embodiment, a mixture comprising a dissociated coordination complex dimer disclosed herein can further comprise monomers.

BRIEF DESCRIPTION OF THE FIGURES

FIG. 1 presents a generalized synthesis scheme for forming a catalyst comprising structural Formula I.

DETAILED DESCRIPTION

As used herein and in the appended claims, the singular forms "a," "and," and "the" include plural referents unless the context clearly dictates otherwise. Thus, for example, reference to "a catalyst" includes a plurality of such catalysts and reference to "the group 15 element" includes reference to one or more group 15 elements known to those skilled in the art, and so forth.

Also, the use of "or" means "and/or" unless stated otherwise. Similarly, "comprise," "comprises," "comprising" "include," "includes," "including," "have," "haves," and "having" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The term "ligand" refers to an ion or molecule that binds to a central metal atom to form a coordination complex. A "ligand" can be either monodentate, or polydentate. For the purposes of this disclosure, a "ligand" also refers to ligands resulting from one or more solvents and elements from Group 16 forming bridges between two or more metal atoms.

The term "donor atom" refers to an atom of a ligand that bonds with a central metal atom to form a coordination complex.

The term "coordination complex" refers to a central metal or a metal ion that is coordinated by one or more donor atoms of one or more ligands by forming bonds, whether ionic, covalent or dipolar, with one or more central metal or metal ions. For purposes of this disclosure, a "coordination complex" refers to a charged coordination complex, such as a cationic coordination complex, and to an uncharged coordination complex. For example, the term "coordination complex dimer" is used throughout the disclosure, is meant to refer to a charged or an uncharged coordination complex dimer, unless provided for otherwise. In a particular embodiment, the coordination complex has a charge of 0, $1^+$, $2^+$, $3^+$, $4^+$, $5^+$, or $6^+$. In a further embodiment, a coordination complex dimer is cationic with a charge of at least $2^+$.

The term "counteranion" also designated as Z in the structural Formulas, refers to anion that neutralizes the charge of a cationic coordination complex. In a certain embodiment, a "counteranion" represents a weakly coordinating anion or a non-coordinating anion. Examples of weakly coordinating anions or non-coordinating anions include, but are not limited to, $BF_4^-$, $PF_6^-$, $SbF_6^-$, and $BAr_4^-$.

The term "alkyl," refers to an organic group that is comprised of carbon and hydrogen atoms that contains single covalent bonds between carbons. Typically, an "alkyl" as used in this disclosure, refers to an organic group that contains 1 to 30 carbon atoms, unless stated otherwise. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkenyl," refers to an organic group that is comprised of carbon and hydrogen atoms that contains at least one double covalent bond between two carbons. Typically, an "alkenyl" as used in this disclosure, refers to an organic group that contains 1 to 30 carbon atoms, unless stated otherwise. While a C1-alkenyl can form a double bond to a carbon of a parent chain, an alkenyl group of three or more carbons can contain more than one double bond. In certain instances the alkenyl group will be conjugated, in other cases an alkenyl group will not be conjugated, and in yet other cases the alkenyl group may have stretches of conjugation and stretches of nonconjugation. Additionally, if there is more than 1 carbon, the carbons may be connected in a linear manner, or alternatively if there are more than 3 carbons then the carbons may also be linked in a branched fashion so that the parent chain contains one or more secondary, tertiary, or quaternary carbons. An alkenyl may be substituted or unsubstituted, unless stated otherwise.

The term "alkynyl," refers to an organic group that is comprised of carbon and hydrogen atoms that contains a triple covalent bond between two carbons. Typically, an "alkynyl" as used in this disclosure, refers to organic group that contains 1 to 30 carbon atoms, unless stated otherwise. While a C1-alkynyl can form a triple bond to a carbon of a parent chain, an alkynyl group of three or more carbons can contain more than one triple bond. If there is more than 1 carbon, the carbons may be connected in a linear manner, or alternatively if there are more than 4 carbons then the carbons may also be linked in a branched fashion so that the parent chain contains one or more secondary, tertiary, or quaternary carbons. An alkynyl may be substituted or unsubstituted, unless stated otherwise.

The term "cycloalkyl," as used in this disclosure, refers to an alkyl that contains at least 3 carbon atoms but no more than 12 carbon atoms connected so that it forms a ring. A "cycloalkyl" for the purposes of this disclosure encompass from 1 to 7 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "cycloalkenyl," as used in this disclosure, refers to an alkene that contains at least 3 carbon atoms but no more than 12 carbon atoms connected so that it forms a ring. A "cycloalkenyl" for the purposes of this disclosure encompass from 1 to 7 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof.

The term "aryl," as used in this disclosure, refers to a conjugated planar ring system with delocalized pi electron clouds that contain only carbon as ring atoms. An "aryl" for the purposes of this disclosure encompass from 1 to 7 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof.

The term "heterocycle," as used in this disclosure, refers to ring structures that contain at least 1 noncarbon ring atom. A "heterocycle" for the purposes of this disclosure encompass from 1 to 7 heterocycle rings wherein when the heterocycle is greater than 1 ring the heterocycle rings are joined so that they are linked, fused, or a combination thereof. A heterocycle may be a hetero-aryl or nonaromatic, or in the case of more than one heterocycle ring, one or more rings may be nonaromatic, one or more rings may be hetero-aryls, or a combination thereof. A heterocycle may be substituted or unsubstituted, or in the case of more than one heterocycle ring one or more rings may be unsubstituted, one or more rings may be substituted, or a combination thereof. Typically, the noncarbon ring atom is N, O, S, Si, Al, B, or P. In case where there is more than one noncarbon ring atom, these noncarbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this invention, include, but are not limited to, substituted or unsubstituted alkyls, substituted or unsubstituted alkenyls, substituted or unsubstituted alkynyls, substituted or unsubstituted aryls, substituted or unsubstituted heterocycles, halos, hydroxyls, anhydrides, carbonyls, carboxyls, carbonates, carboxylates, aldehydes, haloformyls, esters, hydroperoxy groups, peroxy groups, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_4$, $Ge(SH)_4$, $AsO_3H$, $AsO_4H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_4$, $AsO_3H$, $AsO_4H$, $P(SH)_3$, and $As(SH)_3$.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

The term "unsubstituted" with respect to hydrocarbons, heterocycles, and the like, refers to structures wherein the parent chain contains no substituents.

The term "substituted" with respect to hydrocarbons, heterocycles, and the like, refers to structures wherein the parent chain contains one or more substituents.

The term "substituent" refers to an atom or group of atoms substituted in place of a hydrogen atom. For purposes of this disclosure, a substituent would include deuterium atoms, FG, hydrocarbons, heterocycles, and mixed ring systems.

The term "diylidene" refers to an optionally substituted organic group that is comprised of at least two carbon atoms that form double covalent bonds to two group 15 elements, and is further comprised of an intervening hydrocarbon portion of varying length that connects the two group 15 elements together so as to form a polydentate ligand, such that the group 15 elements represent $L_2$-type binding points which can form dipolar or dative bonds with a central metal atom.

The term "alkanediylidene" refers to an optionally substituted diylidene that has an intervening alkane portion of varying length. The length of the alkane portion of an "alkanediylidene" may be specified by using standard alkane naming practices. For example, an "ethanediylidene" would refer to an alkanediylidene that connects the carbons which are doubly bonded to Group 15 elements by a single covalent bond.

A bond indicated by a dashed line indicates a dipolar or a covalent bond. In a particular embodiment, a dashed line indicates a dipolar bond.

The disclosure provides for a catalyst for olefin oligomerization and/or polymerization comprising one or more coordination complex dimers having two palladium central metal atoms. In a certain embodiment the palladium atoms are each bonded to four ligand donor atoms, so that the cationic coordination complex dimer comprises 6 donor atoms. In another embodiment, two of the donor atoms are individually selected group 16 elements, such as oxygen or sulfur. In a further embodiment, each of the group 16 elements is bonded directly to both of the palladium atoms. In yet another embodiment, four of the donor atoms are individually selected group 15 elements, such as nitrogen or phosphorus. In a further embodiment, each of the group 15 elements is bonded to one of the palladium atoms.

The disclosure further provides for a catalyst for olefin oligomerization and/or polymerization comprising one or more dissociated coordination complex dimers, wherein one or more coordination complex dimers disclosed herein is reacted with one or more solvents to form dissociated coordination complexes comprising central palladium metal ions. In a particular embodiment, a dissociated coordination complex of the disclosure comprises two individually selected group 16 elements arising from a coordination complex dimer disclosed herein. In a further embodiment, a dissociated coordination complex of the disclosure comprises at least one group 15 donor atom arising from coordination complex dimer disclosed herein. In a further embodiment, a dissociated coordination complex of the disclosure comprises two group 15 donor atoms arising from a coordination complex dimer disclosed herein. In another embodiment, a dissociated coordination complex of the disclosure comprises at least one donor atom arising from one or more solvents. In yet another embodiment, a dissociated coordination complex of the disclosure comprises two donor atoms arising from one or more solvents.

The disclosure further provides for a method for olefin oligomerization and/or polymerization comprising a catalyst of the disclosure. In a certain embodiment, a method for olefin oligomerization and/or polymerization includes a reaction mixture comprising one or more catalysts disclosed herein, appropriate olefin monomers, and one or more solvents. In a further embodiment, the method for olefin oligomerization and/or polymerization provides for turnover rates of at least 5 mol monomer consumed/(mol catalyst*minute). In yet a further embodiment, a method for olefin oligomerization and/or polymerization comprises one or more protic solvents, such as an alcohol or water. In a particular embodiment, the method for olefin oligomerization and/or polymerization disclosed herein provides for a solvent which can be exposed to air. In another embodiment, the method for olefin oligomerization and/or polymerization disclosed herein provides for olefin oligomerization and/or polymerization without the use of activating agents comprising sensitive metal-carbon bonds. Accordingly, a method for olefin oligomerization and/or polymerization comprising one or more catalysts of the disclosure can be performed without the need to remove oxidizing agents, such as air or water. The method for olefin oligomerization and/or polymerization comprising one or more catalysts of the disclosure therefore provides an answer to the long felt need for an olefin oligomerization and/or polymerization processes that is not plagued by having to promote or maintain air and water free reaction conditions.

As provided above, a catalyst of the disclosure comprises a coordination complex dimer having two central palladium metal atoms, and/or a dissociated coordination complex dimer comprising coordination complexes that have at least one central palladium metal atom. As provided in the disclosure, a catalyst of the disclosure can comprise a coordination complex dimer that is either neutral, or cationic. Further provided in the disclosure, a catalyst comprising a dissociated coordination complex dimer can result from a dissociated neutral or cationic coordination complex dimer. The catalyst palladium atoms are each bonded to four ligand donor atoms. In a certain embodiment, the donor atoms are each bonded directly to one of the palladium atoms. In another embodiment, a catalyst disclosed herein comprises at least one donor atom that is an independently selected element from group 16. In a further embodiment, a catalyst disclosed herein comprises at least two donor atoms that are independently selected elements from group 16. In a further embodiment, a catalyst disclosed herein comprises at least one donor atom that is from a solvent. In a further embodiment, a catalyst disclosed herein comprises at least two donor atoms that are from a solvent. In yet another embodiment, at least two donor atoms are independently selected elements from group 15. In a further embodiment, four donor atoms are independently selected elements from group 15. In a particular embodiment, at least two of the group 15 donor atoms are from a bidentate ligand. In a particular embodiment, four group 15 donor atoms comprise two bidentate ligands. In another embodiment, at least one group 15 donor atoms are from a monodentate ligand. In another embodiment, at least two group 15 donor atoms are from two monodentate ligands. In a further embodiment, four group 15 donor atoms are from four monodentate ligands. In yet a further embodiment, when two or more group 15 donor atoms are from a bidentate ligand, the bidentate ligand is comprised of an organic group. In a certain embodiment, each of the group 16 elements is oxygen or sulfur and each of the group 15 elements is nitrogen or phosphorus.

In a particular embodiment, one or more catalysts of the disclosure is represented by structural Formulas (I), (II), and/or (III):

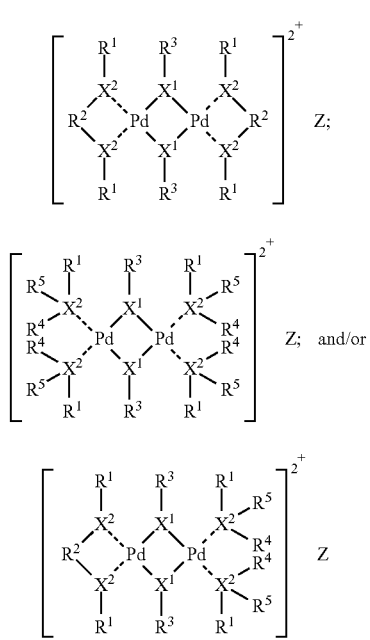

wherein,

Z represents a counteranion;

$R^1$, and $R^3$-$R^5$ are independently selected from the group comprising a hydrogen, deuterium, FG, alkyl, alkenyl, alkynyl, cycloalkyl, cycloalkenyl, aryl, heterocycle, or a mixed ring system;

$R^2$ is a diylidene;

$X^1$ are independently selected elements from Group 16; and $X^2$ are independently selected elements from Group 15.

In a particular embodiment, for a catalyst represented by a structural Formula, each $R^1$ represents the same group; each $R^2$ represents the same group; each $R^3$ represents the same group; each $R^4$ represents the same group; each $R^5$ represents the same group; each $X^1$ represents the same element; and each $X^2$ represents the same element.

In a certain embodiment, for a catalyst represented by the structural Formula, $R^1$ represents a phenyl substituted with one or more branched or unbranched alkyl groups.

In a particular embodiment, $R^2$ represents an alkanediylidene substituted with one or more branched or unbranched alkyl groups.

In a certain embodiment, for a catalyst represented by the structural Formulas of the disclosure, $R^4$ can represent an alkyl or an alkylidene, so that the $R^4$ moieties can each be linked to the elements represented by $X^2$ by a single bond or by a double bond. For instance, if a $R^4$ represents an alkyl group, then that $R^4$ can be linked to $X^2$ by a single bond. Alternatively, if $R^4$ represents an alkylidene group, then that $R^4$ can be linked to $X^2$ by a double bond.

When a cationic coordination complex is charge balanced by the presence of a counteranion, the counteranion, as represented by Z in the structural Formulas, can be a single multi-charged anion or alternatively multiple single charged anions. In a particular embodiment, the counteranion is a weakly coordinating anion or a non-coordinating anion. Examples of suitable single charge weakly coordinating anions or non-coordinating anions include, but are not limited to, $BF_4^-$, $PF_6^-$, $SbF_6^-$, and $BAr_4^-$. Other suitable counteranions include, but are not limited to anions of heteropoly acids, such as $[PW_{12}O_{40}]^{3-}$ and $[SiW_{12}O_{40}]^{4-}$. Other suitable counteranions include, but are not limited, carborane derived anions such as $CB_{11}H_{12}^-$.

In a particular embodiment, a catalyst of the disclosure comprises Formula I:

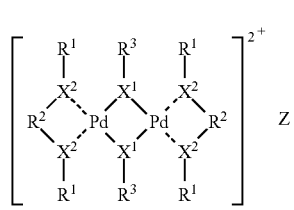

wherein,

Z is a weakly coordinating counteranion or a non-coordinating counteranion.

$R^1$ is an aryl substituted with one or more branched or unbranched alkyl groups;

$R^2$ is an alkanediylidene substituted with one or more branched or unbranched alkyl groups;

$R^3$ is hydrogen;

$X^1$ are independently selected from the group comprising O, S, and Se; and $X^2$ are independently selected from the group comprising N, P, and As.

In a certain embodiment, a catalyst of the disclosure comprises Formula I:

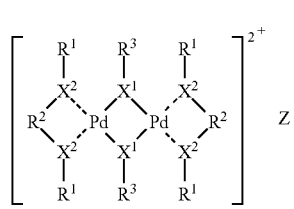

wherein,

Z is a weakly coordinating counteranion or a non-coordinating counteranion.

$R^1$ is an aryl substituted with two tert-butyl groups;
$R^2$ is an ethanediylidene substituted with two alkyl groups;
$R^3$ is hydrogen;
$X^1$ are independently selected from the group comprising O, S, and Se; and
$X^2$ are independently selected from the group comprising N, P, and As.

In a further embodiment, one or more catalysts of the disclosure are represented by structural Formulas (Ia), (IIa), and/or (IIIa):

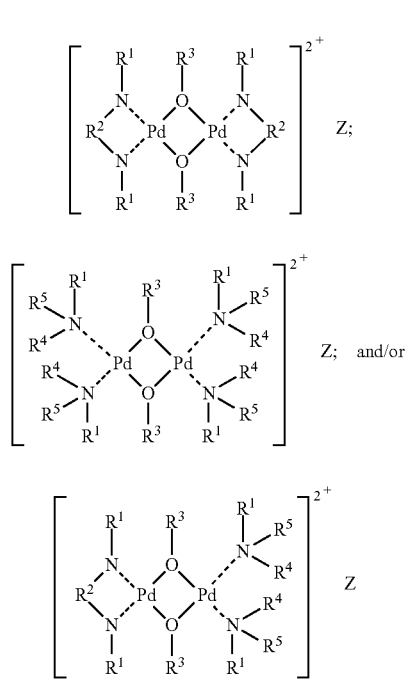

(Ia)

(IIa)

(IIIa)

wherein,

Z represents a counteranion;

$R^1$, and $R^3$—$R^5$ are independently selected from the group comprising a hydrogen, deuterium, FG, alkyl, alkenyl, alkynyl, cycloalkyl, cycloalkenyl, aryl, heterocycle, or a mixed ring system; and $R^2$ is an alkanediylidene.

In a certain embodiment, a catalyst of the disclosure comprises structural Formula IV:

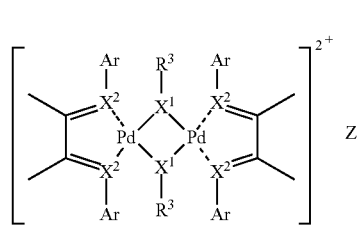

(IV)

wherein,

Z is a counteranion;

$X^1$ are independently selected from the group comprising O, S, Se, and Te; and $X^2$ are independently selected from the group comprising N, P, As, Sb, and Bi.

$R^3$ are independently selected from the group comprising hydrogen, deuterium, FG, alkyl, alkenyl, alkynyl, cycloalkyl, cycloalkenyl, aryl, heterocycle and mixed rings system; and Ar represents an aryl group.

In a particular embodiment, Ar represents a substituted aryl group. In a further embodiment, the substituted aryl group represented by Ar is fully or partially halogenated. For instance, the Ar the can represent a fully or partially fluorinated aryl group.

In a another embodiment, a catalyst of the disclosure comprises structural Formula IVa:

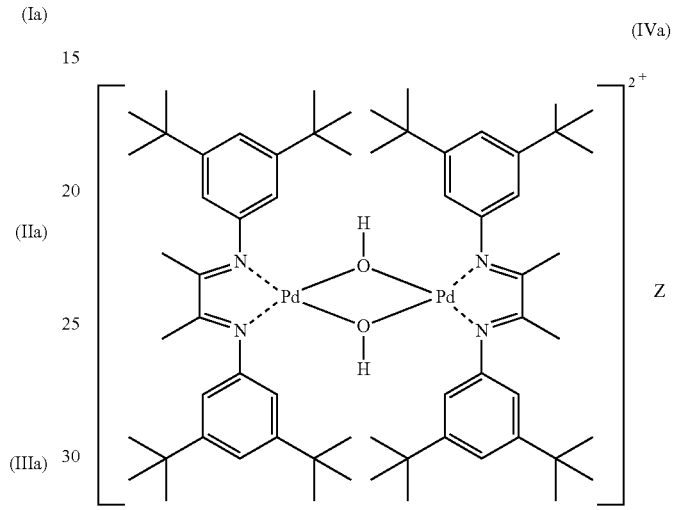

(IVa)

wherein, Z is a counteranion, such as $2BF_4^-$.

Although the coordination complex dimers disclosed above are described as being present in the solution as a catalyst during the olefin oligomerization and/or polymerization process, it is possible that the above catalysts change form during the oligomerization and/or polymerization process. For instance, the catalyst can dissociate to provide a dissociation product that catalyzes the oligomerization and/or polymerization reaction. The dissociation product can include one or both of the palladium atoms from the coordination complex. Without being bound to theory, it is believed that in some instances, the dissociation product consists of or consists essentially of atoms that were originally included in the coordination complex. Accordingly, it is possible that a coordination complex dimer disclosed herein can behave as a precatalyst (or catalyst precursor) during the oligomerization process. As a result, the above use of the term catalyst encompasses both catalytic and precatalytic functionality for the coordination complexes disclosed herein. Therefore, the term "catalyst" refers to the catalytic coordination complex dimer disclosed herein and also refers to catalytic coordination complexes resulting from the dissociation of one or more coordination complex dimers in one or more solvents. Accordingly, the term "catalyst" for the purposes of this disclosure refers to both catalysts and precatalysts, unless stated otherwise. Further, the term "catalyst" also refers to a coordination complex disclosed herein or to combinations of coordination complexes disclosed herein. For instance, the catalyst can include more than coordination complexes disclosed in Formula I through Formula VI. As an example, the catalyst can include a coordination complex disclosed in Formula I and a coordination complex disclosed in Formula III. Alternately, the catalyst can include a coordination complex disclosed in Formula I through Formula VI.

In a particular embodiment, one or more catalysts of the disclosure comprises structural Formula V and/or VI:

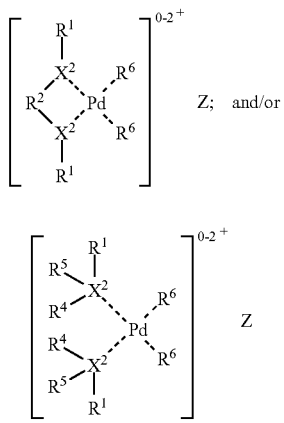

wherein,

Z is a counteranion or is absent if the coordination complex is uncharged;

$X^1$ are independently selected elements from Group 16;

$X^2$ are independently selected elements from Group 15;

$R^2$ is a diylidene;

$R^1$, and $R^3$-$R^5$ are independently selected from the group comprising hydrogen, deuterium, FG, alkyl, alkenyl, alkynyl, cycloalkyl, cycloalkenyl, aryl, heterocycle and mixed rings system $R^6$ are independently selected from the group comprising $X^1R^3$, OH, $OH_2$, $OR^7$, $O(R^7)_2$, and $O(R^7)$ (H); and $R^7$ are independently selected from the group comprising deuterium, alkyl, cycloalkyl, aryl, and heterocycle.

The disclosure provides for catalyzing oligomer or polymer formation, comprising a mixture having one or more dissolved catalysts, one or more solvents, one or more monomers that can undergo a polymerization and/or oligomerization reaction by one or more catalysts disclosed herein, and oligomerized and/or polymerized products. In some instances, the mixture is comprised of more than 50 vol % of oligomerized products. Suitable monomers include, but are not limited to, alkene containing compounds. Suitable alkene containing compounds have up to 10, or up to 20 carbons bonded to one another. The alkene containing compounds can have more than one carbon-to-carbon double bond. In a certain embodiment, the alkenes that serve as the monomers are represented by the formula: $C_nH_{2n}$ where n is greater than or equal to 2 or 3 and/or less than 5, 10, or 20.

In a particular embodiment, the carbon to carbon double bond of alkene containing compound is located at the primary or terminal position (also called α position or the #1 position). Accordingly, the above alkenes can be α olefins or alkenes with the carbon-to-carbon double bond at the terminal end of the backbone rather than located internally on the backbone. When smaller monomers such as ethene and propene are used, the turnover rate is around 5 mol monomer consumed/(mol catalyst*minute). However, as the size of the monomers increases, the monomers isomerize as well as oligomerize. The increased isomerization results in an increased ratio of internal carbon-to-carbon double bonds to external carbon-to-carbon double bonds. The internal carbon-to-carbon double bonds oligomerize more slowly than terminal carbon-to-carbon double bonds. As a result, the increased presence of internal carbon-to-carbon double bonds slows the rate of oligomerization.

The alkenes described above for use as a monomer can be branched or not branched. Additionally or alternately, the above alkenes can be substituted or unsubstituted. Suitable substituents include, but are not limited to, alkyls and aryls. In some examples, the alkenes include ethene and/or propene. The monomers included in the solution can be the same, can include different isomers of the same monomer, or can be made up of different monomers in order to provide a copolymer or a co-oligomer.

In some instances, the above alkenes that serve as the monomer are in the gas phase at the temperature and pressure at which the oligomerization and/or polymerization reaction is conducted. As a result, the one or more solvents can be selected such that the monomer is sufficiently soluble in the one or more solvents that the monomer enters the liquid phase of the one or more solvents so that the oligomerization and/or polymerization reaction occurs in the liquid phase. Accordingly, in some instances, the monomers are introduced into the solution from the gas phase. The one or more solvents in the solution can include a primary solvent. Suitable primary solvents include, but are not limited to, halogenated alkane solvents, non-halogenated alkane solvents, halogenated aromatic solvents, and non-halogenated aromatic solvents. Examples of primary solvents for use in the solution include, but are not limited to, dichloromethane, 1,2-dichloroethane, chlorobenzene or tetrahydrofuran (THF).

The solvent system disclosed herein can include one or more secondary solvents in addition to the one or more primary solvents. Suitable secondary solvents include, but are not limited to, protic solvents such as water and alcohols. Suitable alcohols include, but are not limited to, branched or not branched alkanols either of which can be substituted or unsubstituted, and aryl compounds that include a hydroxyl alcohol group. Examples of suitable alcohols include, but are not limited to, methanol, ethanol, propanol, tert-butanol, trifluoroethanol, phenols, and mixtures thereof. In some instances, increasing the volume % of secondary solvents such as methanol, ethanol, and trifluoroethanol in the solution increases the rate of catalysis. Without being bound to theory, it is believed that this increase in the rate of catalysis may be a result of the secondary solvents accelerating catalyst activation. For instance, these secondary solvents may act as an activating agent during the oligomerization and/or polymerization of monomers, such as propene. In a particular embodiment, the solution includes one or more first solvents selected from a group comprising dichloromethane and 1,2-dichloroethane and one or more second solvents selected from a group comprising ethanol and trifluoroethanol.

One or more of the above primary solvents and/or secondary solvents can be a dry solvent in that it excludes water or a wet solvent that includes water. Additionally or alternately, water can be added to the solution directly as a primary solvent and/or as a secondary solvent. Accordingly, water can serve as a solvent.

During the oligomerization and/or polymerization reaction, a suitable total concentration for the one or more catalysts disclosed above in the solution includes a concentration greater than 1 mM and/or less than 4 mM. A suitable concentration of monomers in the solution includes, but is not limited to, concentrations greater than 50 mM, and/or less than 500 mM, or 2000 mM. Accordingly, a suitable molar ratio of monomer: catalyst in the solution includes, but is not limited to ratios greater than greater than 12.5:1, and/or less than 500:1. When the solution includes a primary solvent, a secondary solvent, and substantially excludes water, the secondary solvent can be more than 0.01 vol %, 0.1 vol %, or 1.0 vol % and/or less than 10 vol %, 5 vol %, or 2 vol % of the total solvent volume in the solution and/or the primary solvent can be more than 50 vol %, 75 vol %, or 95 vol % and/or less than 95 vol %, 75 vol %, or 50 vol % of the total solvent volume in the solution. When the solution includes a primary solvent, a secondary solvent, and water the secondary solvent can be more than 0.01 vol %, 0.1 vol %, or 1.0 vol % and/or less than 10 vol %, 5 vol %, or 2 vol % of the total solvent volume in the solution and/or the primary solvent can be more than 50 vol %, 75 vol %, or 95 vol % and/or less than 95 vol %, 75 vol %, or 50 vol % of the total solvent volume in the solution and/or the water can be more than 0.0 vol %, 0.01 vol % and/or less than 5 vol %, or 90 vol % of the total solvent volume in the solution. In some instances, the solution includes one of the total solvent volumes described above and is more than 50 vol % of the products of the oligomerization.

In a certain embodiment, the mixture disclosed herein can further comprise exposure to oxygen. In some instances, the presence of oxygen in the mixture has been found to stabilize the catalyst and can accordingly extend the life of the catalyst. Oxygen can be added to the mixture by exposing the solution to an atmosphere that includes oxygen before or during the oligomerization reaction. For instance, the mixture can be exposed to air. In some instances, the atmosphere can include oxygen at a higher concentration than air. For instance, the atmosphere can be more than 21 vol % oxygen and can be pure oxygen. The atmosphere can include the monomers in addition to the oxygen or can exclude the monomers. In some instances, the above mixtures include oxygen at more than 0.01% v/v, 1% v/v, or 10% v/v.

During the oligomerization and/or polymerization reaction, a suitable temperature range includes temperatures greater than −10° C., or 20° C. and/or less than 250° C., or 500° C. A suitable pressure range includes pressures greater than 0.12 bar, or 1 bar and/or less than 30 bar, or 100 bar.

The catalytic reaction mixture can be prepared by dissolving one or more coordination complex dimers disclosed herein in one or more solvents. Without being bound to theory, it is believed that the coordination complex dimer dissociates into a monomeric cation and anion. It is also believed that the cation provides the catalytic action (or pre-catalytic action) to the solution. Accordingly, the mixture includes the cations of one or more of the dissociated coordination complexes disclosed herein. The monomers can be added to the solution before and/or after the dissociation of one or more of the coordination complex dimers in the one or more solvents. As a result, the components of the solution are in a single liquid phase.

After and during the oligomerization and/or polymerization reaction, the solution includes at least dissociated or not dissociated catalysts and resulting oligomers. In some instances, the oligomers and/or polymers that result from the oligomerization and/or polymerization reaction include 2 of the monomers and/or less than or equal to 12 of the monomers. The resulting oligomers and/or polymers are a mix of straight oligomers, branched oligomers, straight polymers, and/or branched polymers. The resulting oligomers and/or polymers can be represented by formula $C_{2n}H_{4n}$, with n being a number greater than or equal to 2. For instance, when ethene is used as the only monomer in the solution, the resulting oligomer can be represented by formula $C_{2n}H_{4n}$, with n being a number greater than or equal to 2. When propene is used as the only monomer in the solution, the resulting oligomer can be represented by $C_{2n}H_{4n}$ with n being greater than or equal to 3.

The monomers are described above as being in the gas phase at the temperature and pressure at which the oligomerization and/or polymerization reaction is conducted; however, the oligomerization and/or polymerization reaction can be performed under conditions where the monomers are not in the gas phase and are instead in a liquid phase. As a result, the solution need not be exposed to a gas phase.

The above description of the oligomerization and/or polymerization is performed in a liquid mixture where the mixture comprises monomers, one or more catalysts disclosed herein, one or more solvents, and reaction products. As a result, the oligomerization and/or polymerization occurs in a liquid where the monomers are exposed to one or more catalysts of the disclosure in the liquid. Other systems are possible. For instance, one or more catalysts of the disclosure can be connected to a solid support that contacts a solution that includes at least monomers, one or mores solvents, and reaction products. In this instance, the oligomerization and/or polymerization occurs in a liquid where the monomers are exposed to the catalyst that is connected to a solid support. Alternately, the catalyst can be connected to a solid support that contacts a gas that comprises the monomers. In this instance, the oligomerization and/or polymerization occurs in a gas phase where the monomers are exposed to the catalyst that is connected to a solid support.

A generalized synthesis scheme for forming the catalysts according to Formula I is represented in FIG. 1. The variables $R^1$ through $R^5$, $X^1$, and Z correspond to the variables shown in Formula I through Formula VI above. The synthesis scheme as presented in FIG. 1 comprises three reactions labeled "Reaction 1," "Reaction 2," "Reaction 3."

In Reaction 1, a source of the palladium 1 is reacted with bidentate ligand containing reagent 2 in a solvent system a to afford monomeric coordination complex 3. An appropriate solvent system a for Reaction 1 includes, but is not limited to, dichloromethane, tetrahydrofuran (THF) or benzene. Moreover, solvent system a can be an appropriate mixture of one or more suitable solvents.

In Reaction 2, monomeric complex 3 is reacted with an appropriate ligand 4 in the presence of an appropriate salt c, and in an appropriate solvent b to give monomeric coordination complex 5. An appropriate solvent b includes but is not limited to, tetrahydrofuran, benzene, or dichloromethane. An appropriate ligand 4 is preferably a monodentate based ligand, such as tetrahydrofuran. Moreover, the solvent b can also give rise to ligand 4. An appropriate salt c provides one or more counteranion(s) for the resulting cationic coordination complex. Examples of an appropriate salt c include, but are not limited to, $AgBF_4$, $AgPF_6$ or $AgSbF_6$.

In Reaction 3, monomeric coordination complex 5 is reacted with a group 16 based reagent 6 in the presence of an appropriate base e, such as a polymer-bound diethylamine, in an appropriate solvent d, such as dichloromethane, to afford a compound 7 of Formula I.

Although FIG. 1 illustrates a synthesis scheme for preparing a catalyst of the disclosure having substantially Formula I, the synthesis scheme can be modified such that catalysts of the disclosure having substantially Formula II and Formula III can be prepared. For instance, in Reaction 1, two or more equivalents of a monodentate ligand containing reagent can used to replace bidentate ligand containing reagent 2 to generate a catalyst substantially having Formula II of the disclosure. Alternatively, in Reaction 1, a monodentate ligand containing reagent can be added along with bidentate ligand containing reagent 2 in order to generate a catalyst substantially having Formula III of the disclosure.

The following Examples 1-3 present specific reaction conditions using the synthesis scheme presented of FIG. 1, to synthesize a catalyst comprising structural Formula IV of the disclosure. In these examples, each $R^1$ represents 3,5-di-tert-butylphenyl, each $R^2$ represents 1,2-dimethyl-ethanediylidene, each $R^3$ represents hydrogen, each $X^1$ represents oxygen, and the salt represents $AgBF_4$ to provide $2BF_4^-$ as the counteranion (labeled Z in FIG. 1). Example 4 employs the catalyst synthesized in Example 3 (the catalyst according to Formula IV with $2BF_4^-$ serving as Z) in an oligomerization of ethene. Example 5 employs the catalyst from Example 3 (the catalyst according to Formula IV) in an oligomerization of propene.

EXAMPLE 1

The first reaction illustrated in FIG. 1 was performed with $R^1$ representing 3,5-di-tertbutylphenyl and $R^2$ representing 1,2-dimethyl-ethanediylidene. Dry $CH_2Cl_2$ (40 mL) and $(PhCN)_2PdCl_2$ (816 mg, 2.13 mmol, 1.00 equiv.) were added to a flame-dried round-bottom flask containing a stirbar. A solution of 1,4-bis(3'5'-di-tert-butylphenyl)-2,3-dimethyl-1,4-diaza-1,3-butadiene ($^{tBu}DAB_{Me}$, 1.00 g, 2.17 mmol, 1.02 equiv.) in $CH_2Cl_2$ (10 mL) was added dropwise. The resulting orange suspension was stirred for 1 hour under argon, and then filtered. The resulting crude product was washed with $CH_2Cl_2$ and $Et_2O$ to afford analytically pure [1,4-bis(3',5'-di-tert-butylphenyl)-2,3-dimethyl-1,4-diaza-1,3-butadiene]palladium dichloride (1.32 g) as an orange powder in 97% yield.

EXAMPLE 2

The second reaction illustrated in FIG. 1 was performed using the product of Example 1 and with Z representing $2BF_4^-$. Dry $CH_2Cl_2$ (8 mL) and THF (8 mL) were added to the orange powder of Example 1 (588 mg, 0.922 mmol, 1.00 equiv.) in a flame-dried round-bottom flask containing a stirbar. A solution of $AgBF_4$ (360 mg, 1.85 mmol, 2.01 equiv) in THF (4 mL) was added dropwise under argon. Insoluble AgCl deposited. The orange suspension was stirred for 3 hours and filtered through Celite in a dry box to afford an orange solution. Concentration in vacuo afforded [1,4-bis(3', 5'-di-tert-butylphenyl)-2,3-dimethyl-1,4-diaza-1,3-butadiene]palladium bis(tetrahydrofuran) tetrafluoroborate (735 mg) as an orange powder in 90% yield.

EXAMPLE 3

The third reaction illustrated in FIG. 1 was performed using the product of Example 2 and with $R^3$ representing hydrogen. $CH_2Cl_2$ (50 mL) and the orange powder of Example 2 (460 mg, 0.520 mmol, 1.00 equiv.) were added to a round-bottom flask containing a stirbar. The yellow solution was cooled to 0° C. in an ice-water bath for 10 minutes before several drops of water were added. The yellow suspension was stirred at 0° C. for 10 minutes. With the reaction stirring vigorously, polymer-bound diethylamine (856 mg, 1.07 mmol, 2.05 equiv.) was added over 1 minute. The reaction was stirred for 3 minutes at 0° C. Fast filtration through a bed of Celite afforded a yellow solution that was concentrated in vacuo to afford the catalyst [1,4-bis(3',5'-di-tert-butylphenyl)-2,3-dimethyl-1,4-diaza-1,3-butadiene]palladium($\mu$-OH)] dimer tetrafluoroborate as a yellow powder in 80% yield.

EXAMPLE 4

The catalyst generated in Example 3 (the catalyst according to Formula IV with $2BF_4^-$ serving as Z) was employed in an oligomerization of ethene. [1,4-bis(3',5'-di-tert-butylphenyl)-2,3-dimethyl-1,4-diaza-1,3-butadiene]palladium($\mu$-OH)] dimer tetrafluoroborate (8 mg, 6 $\mu$mol, 0.0030 equiv.) was added to a 48 mL round-bottom flask equipped with a side-arm valve and a 180° joint. The flask was evacuated and back-filled with 1.0 atm of ethylene. A rubber septum was affixed to the side-arm valve though which a premixed solution of $d^2$-dichloromethane (4.0 mL) and $d^3$-trifluoroethanol (4.0 $\mu$L) was injected using a syringe. The light yellow solution was stirred, and aliquots (500 $\mu$L) were taken via syringe for NMR analysis at 30 minute intervals. Ethylene oligomers were generated at a turnover rate of about 5 mol ethene consumed/(mol catalyst*minute).

EXAMPLE 5

The catalyst generated in Example 3 (the catalyst according to Formula IV with $2BF_4^-$ serving as AI) was employed in an oligomerization of propene. [1,4-bis(3',5'-di-tert-butylphenyl)-2,3-dimethyl-1,4-diaza-1,3-butadiene]palladium ($\mu$-OH)] dimer tetrafluoroborate (16 mg, 12 $\mu$mol, 0.0015 equiv) was added to a 270 mL thick-walled flask equipped with a side-arm valve and a 180° joint. The flask was evacuated and back-filled with 0.75 atm of propylene. The flask was then attached and very briefly (~1 s) opened to $O_2$ (1 atm) in order to help prevent deposition of reduced palladium. A rubber septum was affixed to the side-arm value though which a premixed solution of $d^4$-dichloroethane (12 mL) and $d^3$-trifluoroethanol (12 $\mu$L) were added via syringe. The light yellow solution was stirred, and aliquots (500 $\mu$L) were taken via syringe for NMR analysis at 30 min intervals. Propylene oligomers were generated at a turnover rate of about 5 mol propene consumed/(mol catalyst*minute).

Although the above catalysts are disclosed in the context of oligomer formation, it may be possible to employ a catalyst disclosed herein to catalyze olefin polymerization reactions. Accordingly, the principles described above can also be applied for the use of a catalyst of the disclosure to catalyze olefin polymerization reactions.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. A system, comprising:
a catalyst resulting from one or more coordination complex dimers dissociating, each of the one or more coordination complex dimers, having two palladium atoms serving as central atoms, wherein
(i) each of the palladium atoms are bonded to four ligand donor atoms;
(ii) two of the ligand donor atoms are a group 16 element,
(a) the palladium atoms both being bonded to a first one of the group 16 elements, and
(b) the palladium atoms both being bonded to a second one of the group 16 element;
(iii) four of the donor atoms each being a group 15 element,
(a) two of the group 15 elements being bonded to a first one of the palladium atoms, and
(b) another two of the group 15 elements being bonded to a second one of the palladium atoms; and
(iv) monomers taking part in an oligomerization and/or polymerization reaction catalyzed by the catalyst.

2. The system of claim 1, wherein the two group 16 elements are each oxygen or sulfur and the four group 15 elements are each nitrogen or phosphorus.

3. The system of claim 1, wherein the two group 16 elements are each oxygen and the four group 15 elements are each nitrogen.

4. The system of claim 1, wherein two of the group 15 elements are included in a first bidentate ligand and another two of the group 15 elements are included in a second bidentate ligand.

5. The system of claim 1, wherein the one or more coordination complex dimers are represented by structural Formulas (I), (II), and/or (III):

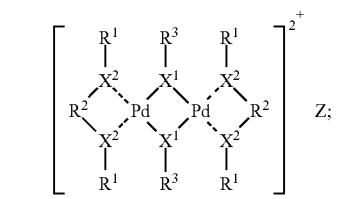

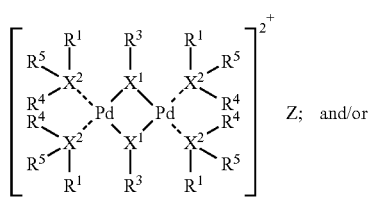

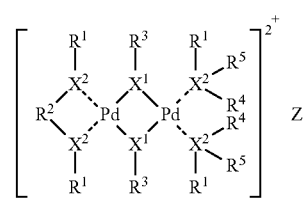

wherein,

Z represents a counteranion;

R¹, and R³—R⁵ are independently selected from the group comprising a hydrogen, deuterium, functional group, alkyl, alkenyl, alkynyl, cycloalkyl, cycloalkenyl, aryl, heterocycle, or a mixed ring system;

R² is a diylidene;

X¹ are independently selected elements from Group 16; and

X² are independently selected elements from Group 15.

6. The system of claim 5, wherein

R¹ are phenyl substituted with one or more branched or unbranched alkyl groups;

R² is an alkanediylidene; and

R³ is hydrogen.

7. The system of claim 5, wherein one or more coordination complex dimers are represented by structural Formula I.

8. The system of claim 7, wherein the coordination complex dimer is represented by structural Formula IV(a):

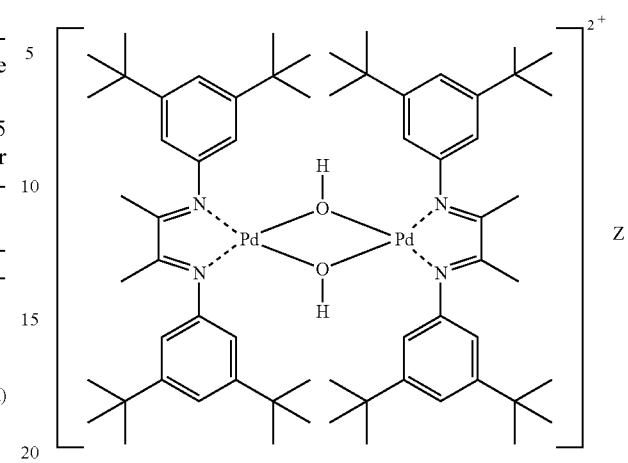

wherein, Z is a counteranion.

9. The system of claim 5, wherein the one or more coordination complex dimers is represented by structural Formula II.

10. The system of claim 5, wherein the one or more coordination complex dimers is represented by structural Formula III.

11. The system of claim 5, wherein Z is a non-coordinating counteranion.

12. The system of claim 5, wherein the monomers are represented by the formula $C_nH_{2n}$ where n is a number that is greater than zero and less than 10.

13. The system of claim 1, wherein the one or more coordination complex dimers are dissolved in a liquid mixture that includes the monomers so that the oligomerization and/or polymerization reaction occurs in the liquid mixture.

14. The system of claim 13, wherein the mixture is more than 0.01 vol % water.

15. The system of claim 13, wherein the mixture is more than 25 vol % of a protic solvent.

16. The system of claim 1, further comprising oligomers and/or polymers resulting from oligomerization and/or polymerization of the monomers and having at least one formula of $C_nH_{2n}$, with n being a number greater than 2.

17. A system, comprising:
one or more coordination complex dimers dissolved in a mixture, the dimers having two palladium atoms serving as central atoms, wherein
(i) each of the palladium atoms are bonded to four ligand donor atoms;
(ii) two of the ligand donor atoms are a group 16 element,
(a) the palladium atoms both being bonded to a first one of the group 16 elements, and
(b) the palladium atoms both being bonded to a second one of the group 16 element;
(iii) four of the donor atoms each being a group 15 element,
(a) two of the group 15 elements being bonded to a first one of the palladium atoms, and
(b) another two of the group 15 elements being bonded to a second one of the palladium atoms; and
(iv) monomers included in the mixture, the monomers taking part in an oligomerization and/or polymerization reaction being catalyzed as a result of the one or more coordination complex dimers being dissolved in the mixture.

18. A method of olefin oligomerization and/or polymerization, comprising:
   generating a system that includes monomers and one or more coordination complex dimers, the dimers having two palladium atoms serving as central atoms, wherein
   (i) each of the palladium atoms are bonded to four ligand donor atoms;
   (ii) two of the ligand donor atoms are a group 16 element,
      (a) the palladium atoms both being bonded to a first one of the group 16 elements, and
      (b) the palladium atoms both being bonded to a second one of the group 16 element;
   (iii) four of the donor atoms each being a group 15 element,
      (a) two of the group 15 elements being bonded to a first one of the palladium atoms, and
      (b) another two of the group 15 elements being bonded to a second one of the palladium atoms; and
   (iv) oligomerizing and/or polymerizing the monomers such that the oligomerization and/or polymerization of the monomers is catalyzed as a result of the one or more coordination complex dimers being included in the system.

19. The method of claim 18, wherein generating the system further comprises dissolving the one or more coordination complex dimers in a mixture, such that the mixture comprises one or more dissociated coordination complex dimers.

\* \* \* \* \*